3,136,651
METHOD OF COATING METAL WITH VINYL RESIN
Clayton I. Spessard, Pasadena, Calif., assignor to United States Steel Corporation, a corporation of New Jersey
No Drawing. Filed Nov. 22, 1961, Ser. No. 154,330
2 Claims. (Cl. 117—21)

This invention relates to a protective coating for metals, specifically a polyvinyl-resin coating, and to a method of compounding and applying such coating.

This is a continuation-in-part of my application Serial No. 777,583, filed December 2, 1958, now abandoned.

Polyvinyl-resin coatings have been applied by dipping or spraying solutions thereof but the cost of the solvent required is excessive. Organosols or plastisols of such resins may be applied by dipping or spraying but require baking to fuse the coating into final form and the cost of the necessary ovens is substantial, particularly if large articles are to be coated. It is accordingly the object of my invention to provide a novel polyvinyl-resin coating composition and methods of making and applying it, whereby metal articles of large size may be provided with a durable, adherent corrosion-resistant coating at relatively low cost. In accomplishing this object, I take advantage of the fact that certain thermoplastic resins, e.g., vinyl co-polymers, are available commercially in very finely divided form, i.e., from 50 to 300 microns.

In a preferred practice of the invention, I compound a novel coating material from fine resin powder, a liquid plasticizer and a liquid stabilizer, by a novel method whereby the composition remains in finely divided form and may therefore be applied by air spraying or dusting onto the articles to be coated, after the latter have been heated and, preferably, primer coated. The fine particles so applied adhere to the base metal and are heated thereby to a temperature at which they fuse and level, forming a uniform, continuous, adherent coating of substantial thickness. After a few seconds necessary for the fusing of the coating by the heat of the metal, the coated article may be cooled by quenching or by natural convection.

A complete understanding of the invention may be obtained from the following detailed description and explanation of the preferred practice by which I compound the coating material and apply it to metal articles.

An essential characteristic of the invention is that the thermoplastic resin used as a coating agent is maintained in the form of a freely flowing powder continuously until it impinges on the heated metal articles to be coated. Certain thermoplastic resins such as vinyl chloride-acetate co-polymers are commercially available as fine powders, e.g., 35 to 55% smaller than 140 mesh, 50% to 80% smaller than 100 mesh and at least 90% smaller than 40 mesh. I have found that such resin powder may be caused to absorb substantial quantities of liquid plasticizer and stabilizer and so treated that it retains its powder form whereby it lends itself readily to application by air-spraying or dusting.

My novel coating composition is prepared by mixing with such resin powder from 5 to 40% of a liquid plasticizer and from 1 to 10% of a liquid stabilizer, both by weight of resin. A preferred composition is 80% resin powder, 16% plasticizer and 4% stabilizer. More specifically the resin powder is a mixture of vinyl chloride-acetate co-polymers, i.e., 38% VYHH, 38% VYNS and 4% VYCM, as designated by one manufacturer, the Bakelite Company. The fineness of the resin particles in a typical example is given by the following screen analysis:

100% smaller than 40 mesh
95% smaller than 60 mesh
80% smaller than 80 mesh
60% smaller than 100 mesh
35% smaller than 140 mesh
20% smaller than 200 mesh The plasticizer may be any of the compounds known to be useful for the purpose in connection with the particular resin involved. Certain esters of organic acids such as phthalic acid are satisfactory plasticizers for polyvinyl resins. These esters may be epoxidized. In the specific example, however, I employ a mixture of di-isodecyl phthalate, di-octyl phthalate and di-propylene glycol dibenzoate, in the ratio of 5:3:2 by weight. Each of such compounds may be used alone. Other plasticizers which may be used are the diesters of adipic, azaleic, benzoic, phthalic and sebacic acids, esters of phosphoric acid such as tricresyl phosphate and tri-(2-ethyl hexyl) phosphate, epoxidized soya bean oil, epoxidized tall oil, an alkyl aryl phosphate and 2-ethyl hexyl butyl phthalate.

The stabilizer may likewise be any available compound capable of desirably affecting the characteristics of the finished coating. As an example, the reaction product of epichlorhydrin and bisphenol A may be mentioned. This is a simple di-epoxide of approximately 192 epoxy equivalent. Preferably, I use a mixture of such product with dibutyl tin dilaurate in a 4:1 ratio by weight. Liquid stabilizers are preferred in order that they may be completely absorbed into the resin along with the plasticizer.

In addition to the resin, plasticizer and stabilizer, the coating composition may include inert fillers or pigments in amounts which do not substantially affect the desired characteristics of the finished coating.

In compounding the coating composition, I mix the liquid plasticizer and stabilizer with the resin powder and, after thoroughly intermingling them, I subject the mixture to a mild heating for a short time to cause the plasticizer and stabilizer to be absorbed by the resin powder. The temperature and time of heating will depend on the disposition of the material. If spread in a layer of, say ½" thickness, heating at a temperature of 100 to 250° F. for from 3 to 8 minutes will suffice. A typical practice involved heating by infra-red radiation for 4 minutes at 125° F. The temperature of drying is inversely proportional to the degree of solvation of the plasticizer and stabilizer. Longer heating is unobjectionable but achieves no purpose. After cooling, and while still granular for the most part, the mixture is broken up, i.e., again reduced to powder form, by putting it through suitable comminuting apparatus such as a "Micronizer" air-jet pulverizer made by Sturtevant Mill Company, to break up any lumps which may result from caking during heating.

Before this treatment, however, I prefer to add to the material a very fine flour to prevent re-agglomeration of the resin particles. This flour may itself be vinyl-chloride polymer such as "Exon 654" (Firestone Plastics Co.) in a particle size of from 0.5 to 2.0 microns, or inert material such as titanium dioxide in particles from 0.2 to 0.4 micron in size or calcium carbonate in a particle size of from 1 to 10 microns. If resin particles be used, 2% thereof by weight of the mixture of resin, plasticizer and stabilizer will suffice but 5% of the titanium dioxide or calcium carbonate may be needed to secure the desired result.

When the mixture of resin powder, plasticizer and stabilizer has been restored to its original finely divided form and the cohesion-preventive flour mixed therewith, the material is ready for application as a dry powder by the method now to be explained.

In coating metal articles with the material produced as explained above, I first heat them (after any necessary cleaning as by abrasive blast) in any convenient manner to a temperature of from 300 to 600° F., preferably about 475° F. I then spray the heated articles with a primer solution of synthetic resin in organic solvents. A suitable primer composition is:

19% resin (14% vinyl chloride, 5% phenol-formaldehyde)
61% solvent (26% toluene, 25% methylisobutyl ketone, 5% xylene and 5% isophorone)
2% modifier (1.5% tricresyl phosphate, 0.5% maleic anhydride)
Balance pigment (e.g., blue lead)
(All percentages by weight.)

As soon as the primer coating has been applied and while the metal articles are at a temperature between 300 and 500° F., preferably about 450° F., I spray the powdered coating material, at substantially room temperature, uniformly over the surface thereof preferably by means of an air jet although gravity sprinkling may also be practiced. As the coating powder strikes the metal articles, the heat thereof causes the powder to fuse and coalesce forming a continuous coating. Application of the powder is continued until a coating of the desired thickness has been built up thereon. This thickness may range from 5 to 60 mils and is preferably at least 10 mils. A short time is allowed for leveling of the fused coating which quickly follows full fusion of the resin by the heat of the metal article. This period is about 10 seconds. Thereafter, the coated articles may be allowed to cool in air or may be water quenched to a hard, abrasion-resistant condition.

Apparatus is known for bleeding a stream of fine particles into an air jet and any such apparatus may be used to carry out the coating operation described above.

Coatings applied in accordance with my invention show excellent properties under various tests, i.e., good adhesion, high resistance to impact and cold flow, high electric resistance after long exposure to salt solution and good resistance to breakdown of bond by electrolysis and bending. The cost of compounding and applying the coating material is low as is that of the equipment used therefor. The method is adaptable to coating large as well as small articles, and coatings up to 60 mils thickness may be readily applied.

Although I have disclosed herein the preferred practice of my invention, I intend to cover as well any change or modification therein which may be made without departing from the spirit and scope of the invention.

I claim:

1. A method of coating metal articles comprising mixing with vinyl resin particles mostly smaller than 40 mesh, 50% to 80% of which are smaller than 100 mesh and 35% to 55% smaller than 140 mesh, from 5 to 40% of a liquid plasticizer for such resin and from 1 to 10% of a liquid stabilizer for said resin, each based on the weight of the resin particles, heating the mixture to a temperature from 100 to 250° F., cooling the mixture,
then adding from 2 to 5% of cohesion-preventive particles less than 10 microns in size, based on the weight of the mixture,
milling the resulting mixture thereby breaking up any lumps existing therein and restoring it to granular form,
and then discharging the resulting granular mixture in a gas stream onto the surface of the articles after preheating them to a temperature at which said resin particles fuse and coalesce on striking the articles, and after coating the preheated articles with a primer solution of synthetic resin in an organic solvent.

2. The method defined in claim 1, characterized by said plasticizer being composed of di-isodecyl phthalate, di-octyl phthalate and di-propylene glycol dibenzoate in a ratio of about 5:3:2 by weight.

References Cited in the file of this patent

UNITED STATES PATENTS

| | | |
|---|---|---|
| 2,270,182 | Collins et al. | Jan. 13, 1942 |
| 2,448,666 | Fletcher et al. | Sept. 7, 1948 |
| 2,467,055 | Sans et al. | Apr. 12, 1949 |
| 2,513,434 | Tinsley | July 4, 1950 |
| 2,530,852 | Bixby | Nov. 21, 1950 |
| 2,550,232 | Donnell et al. | Apr. 24, 1951 |
| 2,668,787 | Schramm | Feb. 9, 1954 |
| 2,719,093 | Voris | Sept. 27, 1955 |
| 2,844,489 | Gemmer | July 22, 1958 |
| 2,974,060 | Dettling | Mar. 7, 1961 |
| 3,015,640 | Weaver et al. | Jan. 2, 1962 |

FOREIGN PATENTS

| | | |
|---|---|---|
| 508,791 | Great Britain | July 3, 1939 |
| 631,850 | Great Britain | Nov. 10, 1949 |
| 700,177 | Great Britain | Nov. 25, 1953 |

OTHER REFERENCES

British Plastics, August 1950, pp. 56–59.